(12) United States Patent
Durand

(10) Patent No.: US 6,817,655 B2
(45) Date of Patent: Nov. 16, 2004

(54) MODULAR BODY AND FRAME ASSEMBLY FOR A VEHICLE

(75) Inventor: Robert D. Durand, Lancaster, PA (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/462,584

(22) Filed: Jun. 16, 2003

(65) Prior Publication Data

US 2004/0012228 A1 Jan. 22, 2004

Related U.S. Application Data

(60) Provisional application No. 60/389,487, filed on Jun. 18, 2002.

(51) Int. Cl.$^7$ ............................................... B60R 27/00
(52) U.S. Cl. ................................................. 296/193.03
(58) Field of Search ...................... 296/193.03, 193.05, 296/203.03

(56) References Cited

U.S. PATENT DOCUMENTS

| | | |
|---|---|---|
| 2,716,032 A | 8/1955 | Barenyi |
| 2,716,040 A | 8/1955 | Barenyi |
| 3,561,813 A | 2/1971 | Barenyi et al. |
| 4,265,587 A | 5/1981 | Clark |
| 4,630,991 A | 12/1986 | Landoll et al. |
| 4,676,545 A | 6/1987 | Bonfilio et al. |
| 5,401,056 A | 3/1995 | Eastman |
| 5,833,269 A | 11/1998 | Gastesi |

FOREIGN PATENT DOCUMENTS

| | | |
|---|---|---|
| DE | 839314 | 5/1952 |
| DE | 299 16 130 | 10/2000 |
| EP | 618106 | 10/1994 |
| FR | 1022987 | 12/1952 |

*Primary Examiner*—Lori L. Coletta
(74) *Attorney, Agent, or Firm*—MacMillan, Sobanski & Todd, LLC

(57) ABSTRACT

A vehicular body and frame assembly includes a plurality of individual frame modules that can be selectively connected together to form customized assemblies. Each of the individual modules can be constructed in any desired manner. To connect the modules together, each module has cooperating first and second connecting structures provided thereon. The first connecting structures are designed to connect to the second connecting structures. For example, the first connecting structures may be formed as hooks provided on the lower portions of the frame modules, and the second connecting structures may be formed as pins provided on the lower portions of the frame modules upon which the hooks can be engaged. The frame modules can be connected together in this manner and pivoted to a mating position, wherein they can be positively retained together by bolts or other fasteners that extend between the mating frame modules.

20 Claims, 1 Drawing Sheet

MODULAR BODY AND FRAME ASSEMBLY FOR A VEHICLE

CROSS REFERENCE TO RELATED APPLICATION

This application claims the benefit of U.S. Provisional Application No. 60/389,487, filed Jun. 18, 2002, the disclosure of which is incorporated herein by reference.

BACKGROUND OF THE INVENTION

This invention relates in general to body and frame assemblies for vehicles. More specifically, this invention relates to an improved structure for a modular body and frame assembly for a vehicle that includes two or more frame modules that are pivotally connected together by a hook and pin system.

Many land vehicles in common use, such as automobiles, vans, and trucks, include a body and frame assembly that is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion of the vehicle are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit that is resiliently supported upon the vehicle wheels by the suspension system. Unitized body and frame assemblies of this general type are found in many relatively small modern vehicles, such as automobiles and minivans.

Traditionally, each model or style of vehicular body and frame assembly has been designed for use with a particular size or type of vehicle. For example, different models or styles of vehicular body and frame assemblies have been designed and built for use with small passenger cars, medium passenger cars, large passenger cars, light trucks, and heavy trucks. Although effective, this approach to the design of vehicular body and frame assemblies has been found to be somewhat limited in flexibility and, therefore, inefficient. This is because each size or type of vehicle requires a unique body and frame assembly, even when portions of differing body and frame assemblies are similar in size or shape. To address this, it is known to provide a vehicle body and frame assembly that is formed from the assembly of two or more individual modules. The assembly of such individual modules has been found to provide increased flexibility in the design of vehicular body and frame assemblies, particularly when portions of the body and frame assemblies are similar in size or shape. However, known modular body and frame assemblies have been found to be relatively difficult to connect together to form the modular body and frame structure. Thus, it would be desirable to provide an improved structure for a modular body and frame assembly for a vehicle that facilitates the connection of adjacent frame modules.

SUMMARY OF THE INVENTION

This invention contemplates that the vehicular body and frame assembly be manufactured from a plurality of individual frame modules that can be selectively connected together to form customized assemblies. Each of the individual modules can be constructed in any desired manner. To connect the modules together, each module has cooperating first and second connecting structures provided thereon. The first connecting structures are designed to connect to the second connecting structures. For example, the first connecting structures may be formed as hooks provided on the lower portions of the frame modules, and the second connecting structures may be formed as pins provided on the lower portions of the frame modules upon which the hooks can be engaged. The frame modules can be connected together in this manner and pivoted to a mating position, wherein they can be positively retained together by bolts or other fasteners that extend between the mating frame modules.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
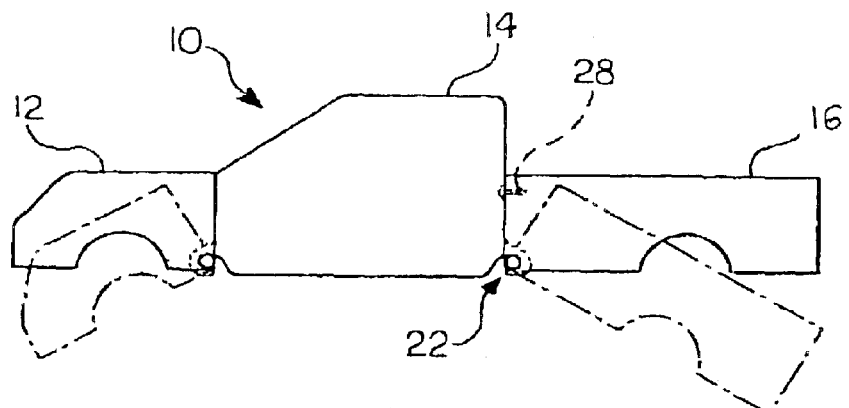
FIG. 1 is a schematic side elevational view of a modular body and frame assembly for a vehicle that is composed of front, intermediate, and rear frame modules in accordance with this invention.

Referring to the drawings, there is schematically illustrated in FIG. 1 a modular body and frame assembly for a vehicle, indicated generally at 10, in accordance with this invention. The illustrated modular body and frame assembly 10 is composed of a front frame module 12, an intermediate frame module 14, and a rear frame module 16. Each of the illustrated frame modules 12, 14, and 16 is designed to support a portion of the other components of the vehicle, including the source of power for the vehicle, the suspension components, the passenger and storage compartments, and the like. Although this invention will be described in the context of the illustrated three module body and frame assembly 10, it will be appreciated that this invention can be practiced using two or more of such individual frame modules.

The illustrated front frame module 12 can be embodied as any structure that is capable of supporting the components that are normally provided at the front end of the vehicle, including the source of power for the vehicle (i.e., engine).

the steering system, and some of the suspension components. The intermediate frame module 14 can be embodied as any structure that is capable of supporting the components that are normally provided at the interior of the vehicle, including the passenger compartment. The rear frame module 16 can be embodied as any structure that is capable of supporting the components that are normally provided at the rear end of the vehicle, including the storage compartment and some of the suspension components.

Figure 2:
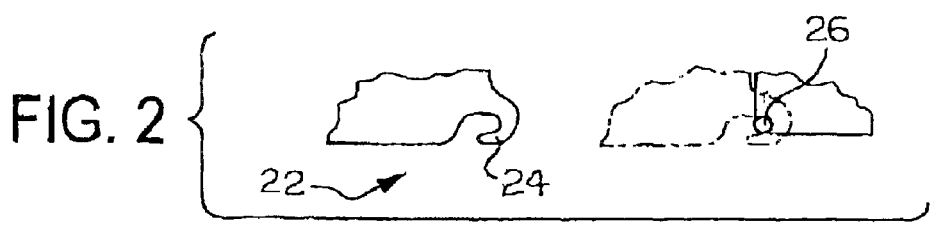
FIG. 2 is an enlarged sectional elevational view of a joint for connecting the intermediate and rear frame modules of the modular body and frame assembly for a vehicle illustrated in FIG. 1.

Referring now to FIG. 2, there is illustrated in detail a joint, indicated generally at 22, for connecting the intermediate and rear frame modules 14 and 16 of the modular body and frame assembly 10 illustrated in FIG. 1. As shown therein, the joint 22 includes a pair of cooperating structures that are formed on the intermediate and rear frame modules 14 and 16. In the illustrated embodiment, such cooperating structures are embodied as a hook 24 that is provided on the intermediate frame module 14 and a pin 26 that is provided on the rear frame module 16. As best shown in FIG. 1, the hook 24 and the pin 26 cooperate to provide a first connection between the intermediate and rear frame modules 14 and 16. However, the joint 22 can be embodied as any other mechanical structure that provides a first connection between the intermediate and rear frame modules 14 and 16. If desired, a plurality of such cooperating hooks 24 and pins 26 may be provided on the intermediate and rear frame modules 14 and 16.

To assemble the modular body and frame assembly 10, the intermediate and rear frame modules 14 and 16 may be initially oriented at an angle relative to one another, as shown by the dotted lines in FIG. 1. Then, the hook 24 of the intermediate frame module 14 and the pin 26 of the rear frame module 16 are moved into cooperation with one another such that the hook 24 engages the pin 26. Next, the rear frame module 16 can be pivoted into alignment with the intermediate frame module 14, as shown by the solid lines in FIG. 1. Lastly, one or more threaded fasteners 28, such as bolts, or other fastening structures can be used to positively secure the rear frame module 16 to the intermediate frame module 14. The front frame module 12 can be secured to the intermediate frame module 14 in a similar manner.

Figure 3:
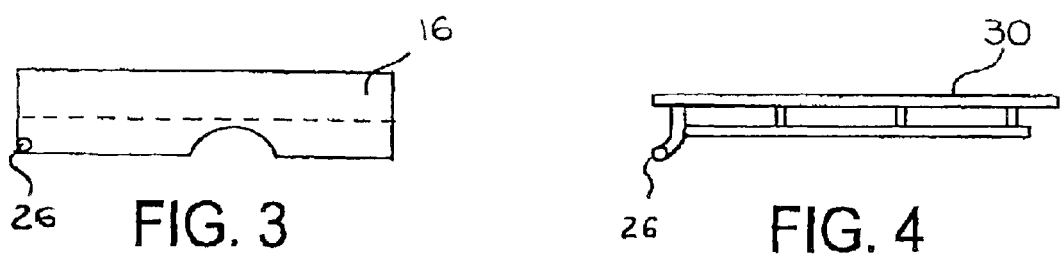
FIG. 3 is a side elevational view of a first embodiment of the rear frame module that can be used to form a portion of a modular body and frame assembly for a pick-up truck.
Figure 4:
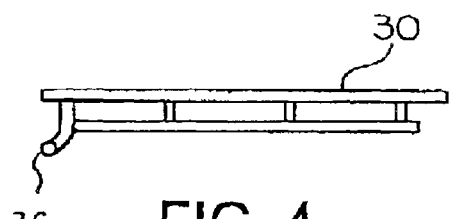
FIG. 4 is a side elevational view of a second embodiment of the rear frame module that can be used to form a portion of a modular body and frame assembly for a flat bed truck.
Figure 5:
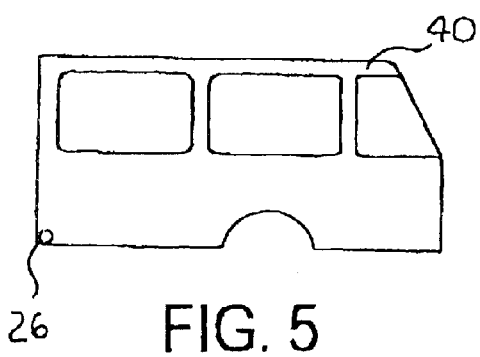
FIG. 5 is a side elevational view of a third embodiment of the rear frame module that can be used to form a portion of a modular body and frame assembly for a sport utility vehicle.
Figure 6:
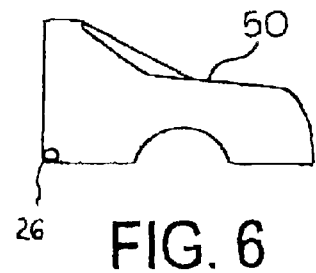
FIG. 6 is a side elevational view of a fourth embodiment of the rear frame module that can be used to form a portion of a modular body and frame assembly for a passenger car.

As shown in FIGS. 3 through 6, the rear module 20 may be embodied as desired to provide flexibility in the overall design of the modular body and frame assembly 10. For example, as shown in FIGS. 1 through 3, the rear frame module 16 can be sized and shaped for use in a conventional pick-up truck. As shown in FIG. 4, a modified rear frame module 30 can be sized and shaped for use in a conventional flat bed truck. As shown in FIG. 5, a further modified rear frame module 40 can be sized and shaped for use in a conventional sport utility vehicle. Lastly, as shown in FIG. 6, a still further modified rear frame module 50 can be sized and shaped for use in a conventional passenger car. The particular size and shape of the various frame modules 12, 14, and 16 can be selected as desired.

The modular body and frame assembly 10 described above is not only advantageous by providing flexibility during manufacture, but also can facilitate repair of a damaged vehicle by allowing one or more of the frame modules 12, 14, and 16 to be removed for repair or replacement. Also, the use of separate frame modules 12, 14, and 16 can facilitate the use of differing materials at different locations of the modular body and frame assembly 10. Such differing materials can include not only different metals, but also non-metallic materials.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A modular body and frame assembly for a vehicle comprising:
   a first frame module;
   a second frame module;
   a joint connecting said first and second frame modules, said joint including a hook provided on one of said first and second modules and a pin provided on the other of said first and second modules, said hook and said pin cooperating with one another to connect said first and second frame modules; and
   a threaded fastener for positively securing said first and second frame modules together.

2. The modular body and frame assembly defined in claim 1 wherein said joint includes a plurality of hooks provided on said first frame module and a plurality of pins provided on said second frame module, said plurality of hooks cooperating with said plurality of pins to connect said first and second frame modules.

3. The modular body and frame assembly defined in claim 1 wherein said joint allows said first frame module to pivot relative to said second frame module.

4. The modular body and frame assembly defined in claim 1 wherein said first frame module is adapted to support a source of power for the vehicle.

5. The modular body and frame assembly defined in claim 1 wherein said first frame module is adapted to support a steering system for the vehicle.

6. The modular body and frame assembly defined in claim 1 wherein said first frame module is adapted to support a suspension component for the vehicle.

7. The modular body and frame assembly defined in claim 1 wherein said second frame module is adapted to support a storage compartment for the vehicle.

8. The modular body and frame assembly defined in claim 1 wherein said second frame is adapted to support a suspension component for the vehicle.

9. A modular body and frame assembly for a vehicle comprising:
   a first frame module;
   a second frame module;
   a third frame module;
   a first joint connecting said first and second frame modules, said first joint including a hook provided on one of said first and second modules and a pin provided on the other of said first and second modules, said hook and said pin cooperating with one another to connect said first and second frame modules;
   a first threaded fastener for positively securing said first and second frame modules together;
   a second joint connecting said second and third frame modules, said second joint including a hook provided on one of said second and third modules and a pin provided on the other of said second and third modules, said hook and said pin cooperating with one another to connect said second and third frame modules; and
   a second threaded fastener for positively securing said second and third frame modules together.

10. The modular body and frame assembly defined in claim 9 wherein said first joint including a plurality of hooks provided on said one of said first and second modules and a plurality of pins provided on said other of said first and second modules, said hooks and said pins cooperating with one another to connect said first and second frame modules.

11. The modular body and frame assembly defined in claim 9 wherein said second joint including a plurality of hooks provided on said one of said second and third modules and a plurality of pins provided on said other of said second and third modules, said hooks and said pins cooperating with one another to connect said second and third frame modules.

12. The modular body and frame assembly defined in claim 9 wherein said first joint allows said first frame module to pivot relative to said second frame module.

13. The modular body and frame assembly defined in claim 9 wherein said second joint allows said second frame module to pivot relative to said third frame module.

14. The modular body and frame assembly defined in claim 9 wherein said first joint allows said first frame module to pivot relative to said second frame module, and wherein said second joint allows said second frame module to pivot relative to said third frame module.

15. The modular body and frame assembly defined in claim 9 wherein said first frame module is adapted to support a source of power for the vehicle.

16. The modular body and frame assembly defined in claim 9 wherein said first frame module is adapted to support a steering system for the vehicle.

17. The modular body and frame assembly defined in claim 9 wherein said first frame module is adapted to support a suspension component for the vehicle.

18. The modular body and frame assembly defined in claim 9 wherein said second frame module is adapted to support a passenger compartment for the vehicle.

19. The modular body and frame assembly defined in claim 9 wherein said third frame module is adapted to support a storage compartment for the vehicle.

20. The modular body and frame assembly defined in claim 9 wherein said third frame module is adapted to support a suspension component for the vehicle.

* * * * *